United States Patent
Miller et al.

(10) Patent No.: US 10,586,216 B2
(45) Date of Patent: Mar. 10, 2020

(54) USER WORK SCHEDULE IDENTIFICATION

(71) Applicant: Microsoft Corporation, Redmond, WA (US)

(72) Inventors: Adi L. Miller, Ramat Hasharon (IL); Haim Somech, Ramat Gan (IL); Shira Weinberg, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 455 days.

(21) Appl. No.: 14/208,609

(22) Filed: Mar. 13, 2014

(65) Prior Publication Data

US 2015/0262132 A1    Sep. 17, 2015

(51) Int. Cl.
  *G06Q 10/10* (2012.01)
  *G06Q 10/06* (2012.01)
  *G06Q 50/00* (2012.01)

(52) U.S. Cl.
  CPC ... *G06Q 10/1097* (2013.01); *G06Q 10/06314* (2013.01); *G06Q 10/063114* (2013.01); *G06Q 10/063116* (2013.01); *G06Q 10/109* (2013.01); *G06Q 50/01* (2013.01)

(58) Field of Classification Search
  USPC .................................. 705/7.11–7.42
  See application file for complete search history.

(56) References Cited

U.S. PATENT DOCUMENTS

| | | | |
|---|---|---|---|
| 6,988,128 B1 | 1/2006 | Alexander et al. | |
| 7,318,040 B2 | 1/2008 | Doss et al. | |
| 7,617,308 B2 | 11/2009 | Doss et al. | |
| 8,494,890 B2 | 7/2013 | Doss et al. | |
| 2005/0137925 A1* | 6/2005 | Lakritz | G06Q 10/06 705/7.22 |
| 2005/0171834 A1 | 8/2005 | Yokota et al. | |
| 2006/0206347 A1* | 9/2006 | Chen | G06Q 10/00 705/7.25 |

(Continued)

OTHER PUBLICATIONS

Whiteside, et al., "Usability Engineering: Our Experience and Evolution", Handbook of Human-Computer Interaction, Elsevier Science Publishers B.V. (North-Holland), 1988 (Year: 1988).*

(Continued)

*Primary Examiner* — Amber A Misiaszek
(74) *Attorney, Agent, or Firm* — Shook, Hardy and Bacon, L.L.P.

(57) ABSTRACT

One or more techniques and/or systems are provided for determining a user work schedule. A user may seldom update actual work hours, such as within a calendar, to reflect an actual schedule of the user, which may result in erroneous information being exposed to services that may notify other users as to when the user is inside or outside work hours. Accordingly, user signals (e.g., a current device location, execution of a work-related app, access to a work VPN, participation in a conference call from home, etc.) may be evaluated to generate a set of user activity patterns that may be indicative of recurring work patterns of the user. A user work schedule for the user may be determined based upon the set of user activity patterns. The user work schedule may be used to modify user interfaces (e.g., a conferencing website, a phone app, etc.) exposed to other users.

20 Claims, 11 Drawing Sheets

(56) References Cited

U.S. PATENT DOCUMENTS

2009/0300525 A1* 12/2009 Jolliff ................ H04M 1/72544
                                                          715/764
2010/0077400 A1    3/2010  Ioannou
2010/0174998 A1    7/2010  Lazarus et al.
2013/0035929 A1    2/2013  Okamoto et al.
2013/0212252 A1*  8/2013  Los ................ G06Q 10/063114
                                                          709/224

OTHER PUBLICATIONS

"International Search Report and Written Opinion Issued in PCT Patent Application No. PCT/US2015/019547", dated Jun. 10, 2015, 10 Pages.

"Second Written Opinion Issued in PCT Application No. PCT/US2015/019547", dated Jan. 27, 2016, 6 Pages.

"International Preliminary Report on Patentability Issued in PCT Application No. PCT/US2015/019547", dated Apr. 21, 2016, 7 Pages.

"Office Action Issued in European Patent Application No. 15711978.5", dated May 11, 2018, 8 Pages.

* cited by examiner

USER WORK SCHEDULE IDENTIFICATION

BACKGROUND

Many users maintain calendars for managing meetings and/or specific tasks. For example, a user may maintain a social network calendar within a social network, an office productivity calendar within an office suite, etc. The user may populate such calendars with entries, such as a work meeting entry, a get gas entry, and/or other entries specified by the user. The user may share and/or expose the calendar to other users. For example, a scheduling administrator may be provided with read and/or write access to an employee calendar so that the scheduling administrator may add work meetings entries into the employee calendar.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for determining a user work schedule are provided herein. A set of users signals, such as comprising an explicit user signal (e.g., a user created calendar appointment) and/or an implicit user signal (e.g., a user device location indicating that the user is at work), associated with a user may be retrieved for evaluation. In an example, a device context of a device associated with the user may be evaluated to identify a user signal (e.g., a device location indicating that the user is at a coffee shop, a work location, or a home; a mode of transportation such as traveling in a car; etc.). In another example, a user context of the user may be evaluated to form, identify and/or enrich a user signal (e.g., a programmer user may execute a programming developer app while at a coffee shop; the user may access a web conferencing website while at home; the user may post a social network message to a social network profile that the user is going to start attending work training classes on Sunday nights for the next year; etc.). In this way, the set of user signals may be retrieved. In some embodiments, a user may opt in or otherwise acquiesce to having any one or more of such user signals collected, evaluated, etc.

A set of user activity patterns may be generated for the user based upon evaluating the set of user signals. In an example, a user activity pattern may indicate that the user is at the coffee shop from 8:00 am to 1:00 pm on Sundays using the programming developer app, which may be indicative of the user working outside of a normal work place. In another example, a user activity pattern may indicate that the user is working on Sunday nights while attending work training classes. A user work schedule of the user may be determined based upon the set of user activity patterns. The user work schedule may provide a relatively high level of granularity regarding work patterns of the user, such as working from home, being on a conference call while driving, having a varying daily schedule (e.g., different work patterns may be specified at day granularities, week granularities, month granularities, and/or other levels of granularity). The user work schedule may be exposed to other users and/or used to modify user interfaces accessible to such users. In an example, a phone app may display a work status for the user based upon the user work schedule. In another example, a conferencing website may display the work status. In another example, a contact card (e.g., accessible through a website, an app, a social network, etc.) may be populated based upon the user work schedule derived from the set of user activity patterns. In an example, the user work schedule may be updated based upon new behavior patterns of the user (e.g., locational data for the user may indicate that the user is at home on Sunday nights, and thus the work training classes on Sunday nights may have ended) and/or may be dynamically overridden based upon real-time information (e.g., the user may be late for a meeting due to traffic).

In an example, a work schedule component, configured for determining the user work schedule, may be implemented on a client device, which may improve security and/or preserve privacy of user signals collected from the client device and/or may support offline operation. In another example, the work schedule component may be implemented on a server, which may improve access to various user signals that may be remote to the client device (e.g., information on a second device, a social network profile, etc.) and/or may improve the ability to expose the user work schedule to other users and/or devices. In some embodiments, a work schedule component and/or functionality thereof may be distributed across multiple devices, such as a client device and a server, for example. For example, some user signals may be ascertained from the client device while the server may expose the user work schedule to other users. Some or all of the user work schedule may be generated, updated, etc. by the client device and/or the server. In some embodiments, a user may opt in or otherwise acquiesce to having a work schedule and/or other information about the user exposed, published, disseminated, etc., such as to other users through applications, devices, user interfaces, etc., for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
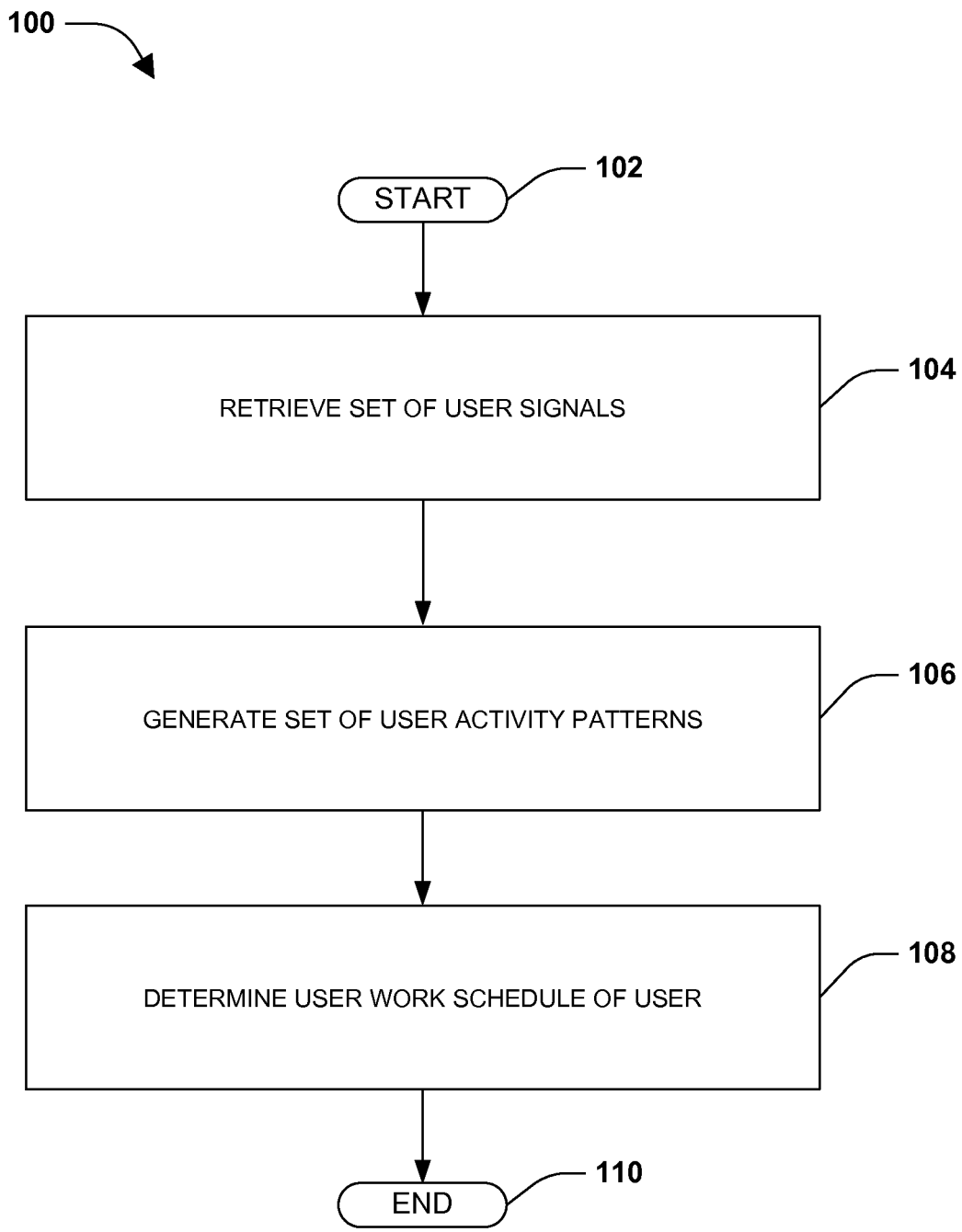
FIG. 1 is a flow diagram illustrating an exemplary method of determining a user work schedule.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for determining a user work schedule are provided. Because a user may seldom update work hours, such as within a calendar, that reflect an actual work schedule of the user, it may be advantageous to determine a user work schedule for the user based upon various user signals (e.g., a current location of the user being at a worksite; a realtor user interacting with a real estate listing service while at home to post new home sales on Sunday nights; etc.). The user work schedule may be shared with users, such as through a phone app, a user contact interface, a conferencing website, a social network, a calendar, and/or a variety of other apps, websites, and/or services.

An embodiment of determining a user work schedule is illustrated by an exemplary method 100 of FIG. 1. At 102, the method starts. At 104, a set of user signals associated with a user may be retrieved. In an example, a device context of a device associated with the user may be evaluated to identify a user signal. The device context may comprise a device location (e.g., a GPS location indicating that the user is at a worksite), a current time (e.g., the user is at the worksite on Saturday mornings), a mode of transportation (e.g., GPS data indicating that the user walks through a park on Friday mornings and is thus probably not working), a device location check-in (e.g., the device provides a social network with a current location when the user visits the location), an alarm (e.g., the user may set a recurring alarm on the device to attend a work meeting on Sunday mornings), a charging state (e.g., the device may be charging, which may indicate that the user is at home or work), a connectivity state (e.g., the device may be connected to a work VPN), user data stored on the device (e.g., a work schedule, a soccer schedule, a school schedule, a subscription, a membership, etc.), and/or a variety of other device information.

In another example, a user context may be evaluated to form, identify and/or enrich a user signal for retrieval. The user context may comprise a social network profile (e.g., the user may register for a weekly work-related webcast through a professional social network), a website access by the user (e.g., a realtor website accessed by a realtor for work purposes), a social network post (e.g., the user may post that the user is now working late on Fridays for the next year based upon a job promotion), an email (e.g., a user may send various work-related emails, which may indicate that the user is working), a message (e.g., the user may receive an instant message instructing the user to visit a work related website), a calendar entry (e.g., the user may have a meeting scheduled within a calendar), real-time data (e.g., traffic data indicating that the user will be late), a phone call (e.g., the user may call a client on Sundays), an application executed by the user (e.g., a programmer may execute application developer software while at home to work on a work-related project), interaction with a service (e.g., the user may access an exercise tracking service during lunch hours to go on a run, which may indicate that the user is not working), a description of a current location (e.g., a description of a current location as a movie theater which may indicate that the user is not working), and/or any other user data. In this way, the set of user signals may be retrieved from a variety of sources (e.g., a mobile device of the user, a tablet of the user, a social network profile of the user, etc.).

At 106, a set of user activity patterns for the user may be generated based upon evaluating the set of user signals. In an example, a recurring activity of the user may be identified as a user activity pattern based upon the set of user signals (e.g., a user may frequently visit a coffee shop and log into a work VPN on Saturday mornings). One or more user location signals may be aggregated over time to detect a pattern of recurring instances of a work activity as a user activity pattern for inclusion within the set of user activity patterns. In an example, user signals may be weighted for evaluation. For example, a first user signal weight may be applied to a first user signal to create a first weighted user signal (e.g., a relatively high weight may be assigned to a user signal indicating that the user is to participate in a conference call, which may be indicative of a work user activity pattern). A second user signal weight may be applied to a second user signal to create a second weighted user signal (e.g., a relatively low weight may be assigned to a user signal indicating that the user is driving a car because driving a car may not provide strong evidence whether the user is working, for example). The first weighted user signal and the second weighted user signal may be evaluated to generate a first user activity pattern, such as a work conference call user activity pattern based upon the first weighted user signal, indicating that the user is on a conference call working, having a relatively higher weight than the second weighted user signal indicating that the user is merely driving.

At 108, a user work schedule of the user may be determined based upon the set of user activity patterns. In an example, a machine learning algorithm may be utilized to evaluate the set of user activity patterns to determine the user work schedule. A work user activity pattern may be identified for inclusion within the user work schedule based upon a variety of activity patterns, such as a work conference call activity pattern, a work from home activity pattern (e.g., the user logs into a work VPN on Tuesday nights from home), a work from out-of-office location activity pattern (e.g., the user is at a remote worksite at regular or repeating times), a work-related application interaction activity pattern (e.g., a programmer is using application developer software while at a coffee shop), a work-related website interaction activity pattern (e.g., a programmer may do internet research for coding techniques), a work-related service interaction activity pattern (e.g., a user may access a conferencing center service from a phone), a travel to meeting activity pattern (e.g., the user may travel on Saturdays to a client for meetings), a travel to secondary work location activity pattern, a meeting activity pattern, and/or a variety of other activity patterns.

In an example, user activity patterns may be weighted for evaluation. For example, a first user activity weight may be applied to a first user activity pattern to create a first weighted user activity pattern (e.g., a relatively lower weight may be assigned to a leaving work activity pattern on Tuesdays during lunch hours because the leaving work activity pattern may not provide a strong indication as to whether the user stopped working or is continuing to work). A second user activity weight may be applied to a second user activity pattern to create a second weighted user activity pattern (e.g., a relatively higher weight may be assigned to a visit client activity pattern on Tuesdays during lunch hours because visiting a client is a relatively strong indication that the user is working). The user work schedule may be determined based upon evaluating the first weighted user activity pattern and the second weighted user activity pattern (e.g., Tuesdays during lunch hours may be identified as user work time due to the second weighted user activity pattern, indicating that the user is working by visiting a client, having a relatively higher weight than the first weighted user activity pattern). In an example, a user activity weight may be based upon an activity frequency (e.g., does the user visit the client every Tuesday or sporadically), an activity intensity (e.g., the user participates in a conference call during work hours while at a worksite, which may have a strong indication that the user is working), an activity confidence (e.g., visiting a client may have a relatively higher confidence or working than driving a car), an activity freshness (e.g., how recently has the user visited the client on a Tuesday), etc.

The user work schedule may define work days for the user at various levels of granularity. In an example, a first work day schedule for a first work day (e.g., Monday) may indicate that the user has a conference call from 8:00 am to 9:00 am, works from a coffee shop from 9:30 am to 1:00 pm, has non-work availability from 1:00 pm to 3:00 pm, routinely visits a client from 4:30 pm to 6:00 pm, visits a gym as non-work availability from 6:15 pm to 7:30 pm, and logs into a work VPN from 8:30 pm to 10:00 pm. A second work day schedule for a second work day (e.g., Tuesday) may specify different work activities and/or times for the user based upon user signals associated with prior Tuesdays.

In an example, the user work schedule may be shared through a user interface, provided to a second user, and/or used to modify a user interface. In an example, a social network user interface may be modified based upon the user work schedule (e.g., a current status of a user may be set to working or conference call). In another example, a user contact user interface may be modified based upon the work schedule (e.g., a contact, maintained by a cell phone of a second user for the user, may indicate that the user may be unavailable to take a phone call because the user is generally participating in a work related conference call). In another example, a communication user interface may be modified based upon the user work schedule (e.g., a chat app may indicate to a second user that the user is usually traveling to a coffee shop to work and that the user may be available in about 15 minutes). In another example, a website user interface may be modified based upon the user work schedule (e.g., a conference center website may indicate that the user is available to participate in a conference call). In another example, a secondary user interface provided to a second user may be modified based upon the user work schedule (e.g., a videogame console interface may indicate that the user is logged off because the user is usually researching work on Tuesday nights).

Identified behavior changes of the user may be used to update the user work schedule. For example, a first work entry within the first user work schedule may be identified. The first work entry may occur at a first temporal interval (e.g., the user may have routinely visited a client on Thursdays from 1:00 pm to 3:00 pm). A new user signal associated with the first temporal interval may be identified (e.g., within the last two months the user may be at home from 1:00 pm to 3:00 pm, thus indicating that the user no longer visits the client on Thursdays from 1:00 pm to 3:00 pm). A new user activity pattern may be generated based upon the new user signal (e.g., the user may have non-work availability on Thursdays from 1:00 pm to 3:00 pm). The first work entry may be overwritten based upon the new user activity pattern to create an updated user work schedule (e.g., the updated user work schedule may be automatically updated and/or provided to a second user such as by a dynamic update/synchronization with a communication app on a second user device).

Real-time data may be used to evaluate and/or override (e.g., temporarily override) the user work schedule. For example, a user activity pattern change may be identified based upon real-time data associated with the user (e.g., the user may generally attend a work meeting on Tuesday mornings, but traffic conditions and a current location of the user may indicate that the user is going to be 20 minutes late). A portion of the user work schedule may be overridden based upon the user activity pattern change to create a current overridden user work schedule (e.g., the current overridden user work schedule may indicate that the user is available for a phone call while driving as opposed to usually being unavailable due to being in a work meeting; a notification of the scheduling delay may be dynamically provided to participants of the meeting; etc.). At 110, the method ends.

FIGS. 2A-2D illustrate examples of a system 212 for determining a user work schedule. The system 212 comprises a work schedule component 206. The work schedule component 206 is configured to retrieve a set of user signals, such as a device context 202 and/or a user context 204, associated with a user, as illustrated by example 200 of FIG. 2A. The device context 202 may specify a connectivity state, a device location, a device time, a device location check-in, a mode of transportation, user data (e.g., images, files, messages, email, a task list, etc.), a device alert, application data (e.g., a phone app, a conference call app, a work-related messaging app, etc.), etc. The user context 204 may specify professional social network profile data (e.g., indicating that the user subscribed to a weekly information meeting on Monday nights), a phone call log (e.g., indicating that the user routinely calls a conferencing center on Saturday mornings), a user location (e.g., the user routinely visits a coffee shop on Sundays from 6:00 am to 1:00 pm), execution of application developer software (e.g., the user routinely executes the application developer software on Sundays from 6:00 am to 1:00 pm), access to a programming website (e.g., the user routinely accesses a programming website on Tuesdays from 7:00 pm to 9:00 pm), etc.

The work schedule component 206 may be configured to generate a set of user activity patterns 208 for the user based upon evaluating the set of user signals. In an example, the work schedule component 206 may apply user signal weights 210 to the set of users signals for evaluation of the set of user signals (e.g., relatively higher weights may be assigned to user signals that may strongly indicate that the user is engaging in a recurring activity that is either work related or non-work related). The set of user activity patterns 208 may indicate that the user has a first work user activity pattern of being at work from 7:30 am to 4:00 pm, a non-work user activity pattern from 4:30 pm to 6:00 pm (e.g., the user may routinely visit a gym), and a second work user activity pattern from 7:00 pm to 8:30 pm (e.g., the user may routinely access a social network conference app from home to engage in work conference calls) on Mondays. The set of user activity patterns 208 may indicate that the user has a third work user activity pattern of being at work from 7:30 am to 9:00 am, a fourth work user activity pattern of visiting a remote worksite from 10:30 pm to 3:00 pm, and a fifth work user activity pattern of working from home from 7:00 pm to 9:00 pm (e.g., the user may access a programming website) on Tuesdays. The set of user activity patterns 208 may indicate that the user has a sixth work user activity pattern of calling into a conferencing center from 8:00 am to 10:00 am on Saturdays. The set of user activity patterns 208 may indicate that the user has a seventh work user activity pattern of working from a coffee shop to develop a work app from 6:00 am to 1:00 pm on Sundays. In this way, the set of user activity patterns are generated.

Figure 2A:
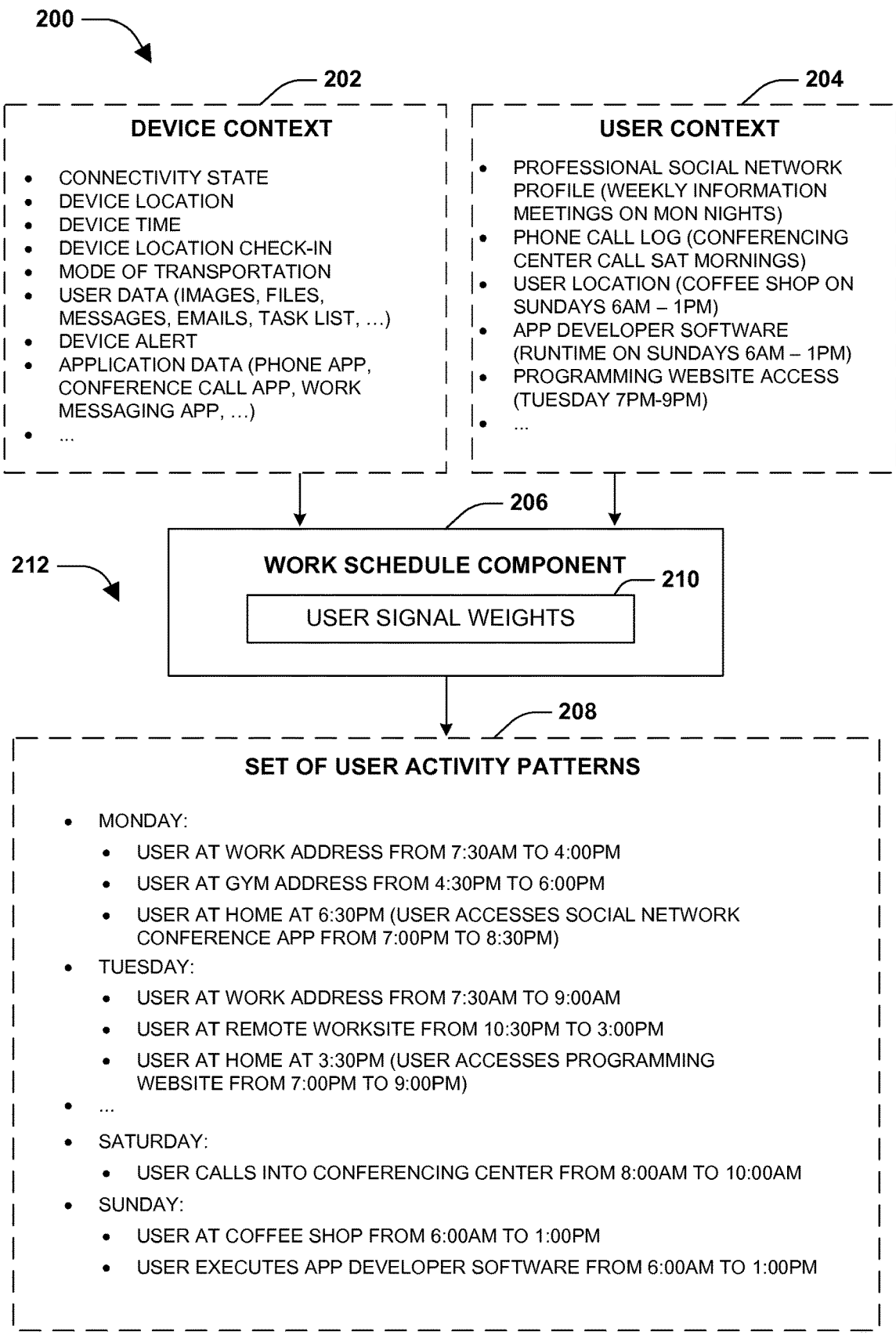
FIG. 2A is a component block diagram illustrating an exemplary system for determining a user work schedule.
Figure 2B:
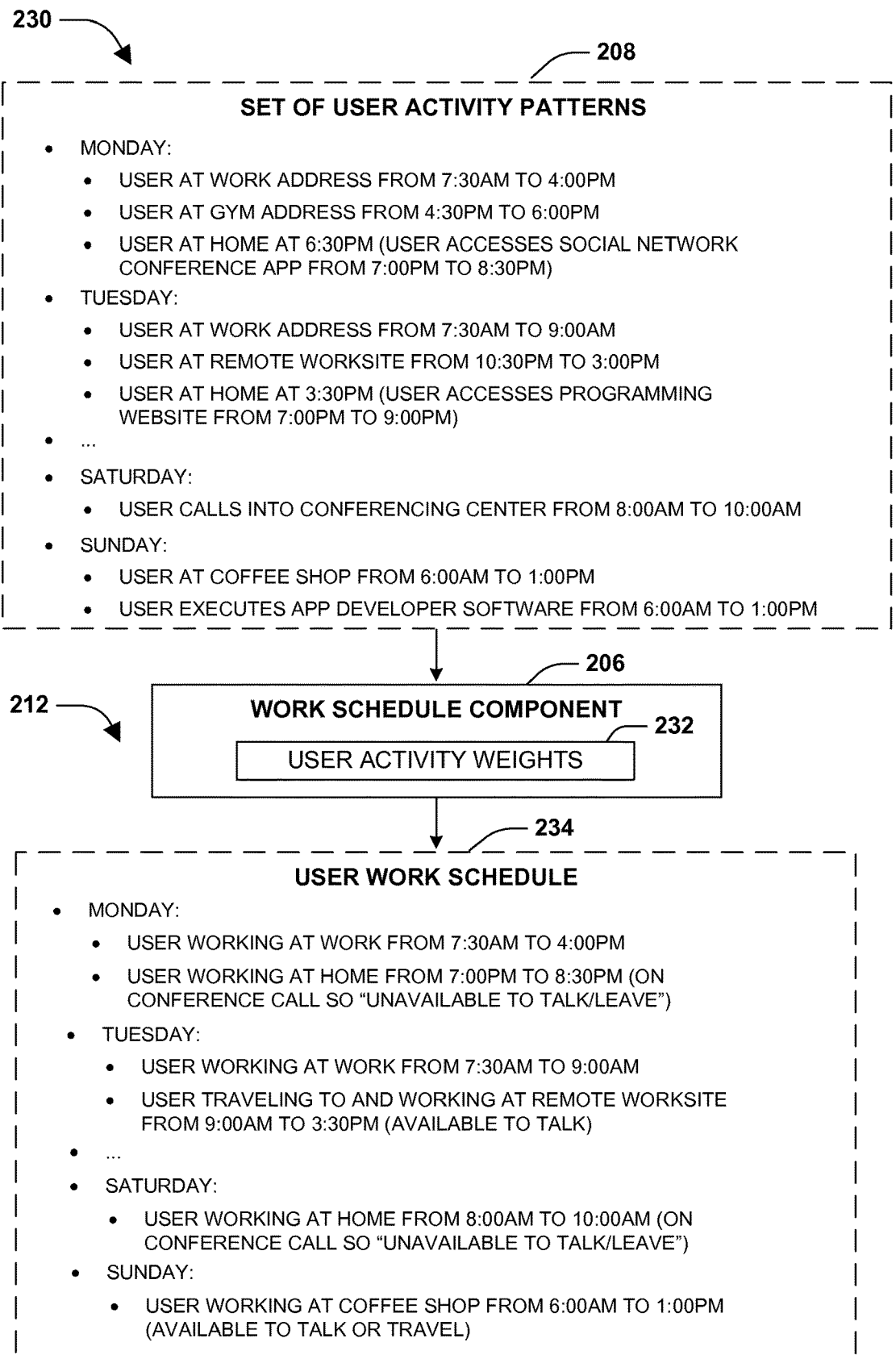
FIG. 2B is a component block diagram illustrating an exemplary system for determining a user work schedule.

The work schedule component 206 may be configured to determine a user work schedule 234 for the user based upon the set of user activity patterns 208, as illustrated by example 230 of FIG. 2B. In an example, the work schedule component 206 may apply user activity weights 232 to the set of user activity patterns 208 for evaluation of the set of user activity patterns 208 to determine the user work schedule 234 (e.g., relatively higher weights may be assigned to user activity patterns that may strongly indicate that the user is engaged in either a work related activity or a non-work related activity during a particular time). The user work schedule 234 may indicate that the user is working at a worksite from 7:30 am to 4:00 pm and that the user is working at home from 7:00 pm to 8:30 pm (e.g., and is unavailable to talk or leave because the user is generally on a conference call) on Mondays. The user work schedule 234 may indicate that the user is working at a worksite from 7:30 am to 9:00 am and that the user is traveling to and working at a remote worksite from 9:00 am to 3:30 pm (e.g., and that the user is available to talk while traveling to and working at the remote worksite) on Tuesdays. The user work schedule 234 may indicate that the user is working at home from 8:00 am to 10:00 am (e.g., and is unavailable to talk or leave because the user is generally on a conference call) on Saturdays. The user work schedule 234 may indicate that the user is working at a coffee shop from 6:00 am to 1:00 pm (e.g., and is available to talk and/or travel) on Sundays.

Figure 2C:
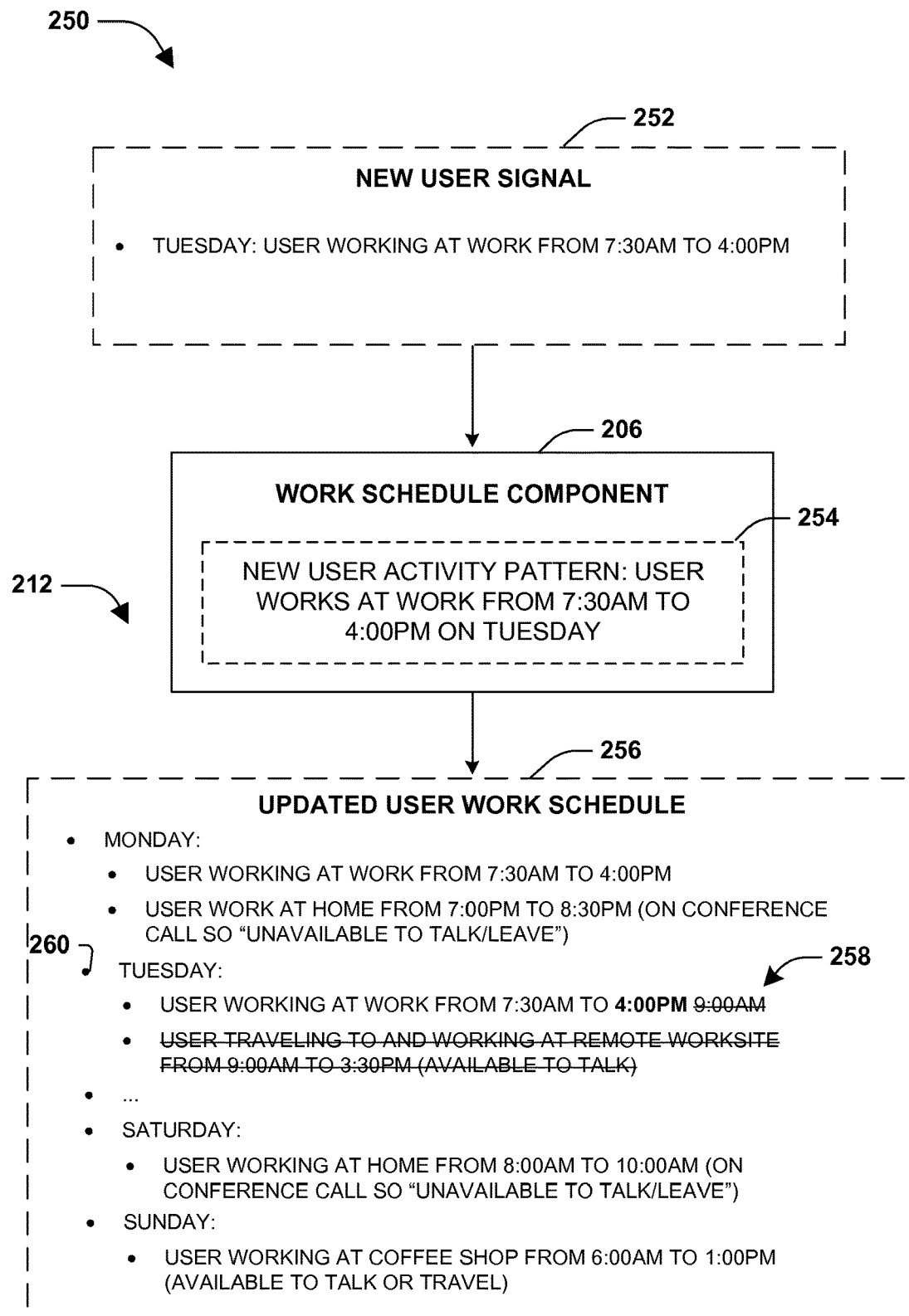
FIG. 2C is a component block diagram illustrating an exemplary system for determining a user work schedule.

The work schedule component 206 may be configured to update the user work schedule 234 to create an updated user work schedule 256, as illustrated by example 250 of FIG. 2C. In an example, the work schedule component 206 may identify a new user signal 252 associated with a temporal interval of a work entry within the user work schedule 234. For example, the new user signal 252 may correspond to a user working at a worksite from 7:30 am to 4:00 pm on Tuesday, which may correspond to a Tuesday work entry 260 indicating that the user is working at work from 7:30 am to 9:00 am and that the user travels to and works at a remote worksite from 9:00 am to 3:30 pm. The work schedule component 206 may use the new user signal 252 to generate a new user activity pattern 254 (e.g., a change in behavior of the user) where the user works at work from 7:30 am to 4:00 pm on Tuesdays. Accordingly, the work schedule component 206 may overwrite 258 the Tuesday work entry 260 based upon the new user activity pattern 254 to create the updated user work schedule 256.

Figure 2D:
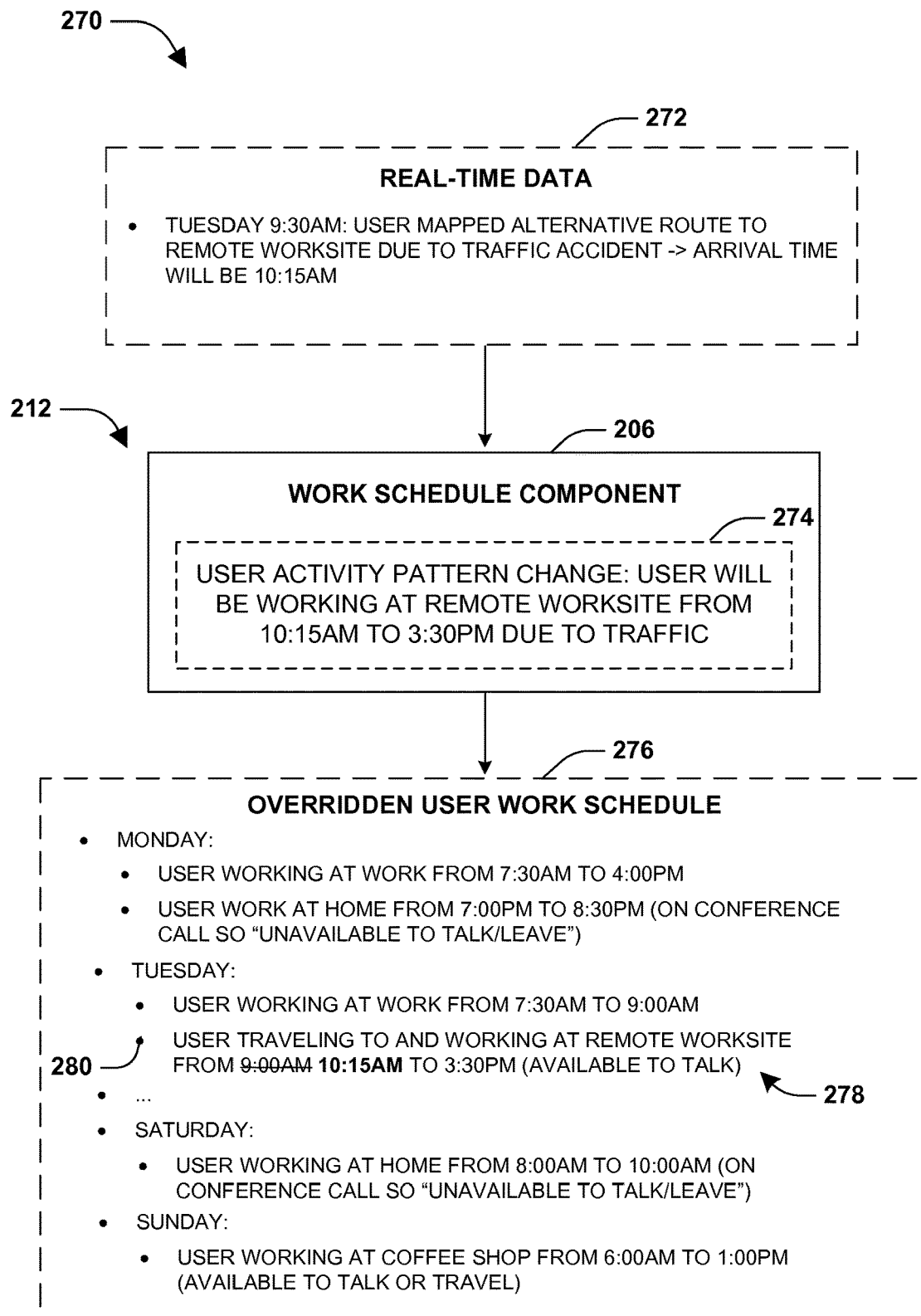
FIG. 2D is a component block diagram illustrating an exemplary system for determining a user work schedule.

The work schedule component 206 may be configured to override 278 (e.g., temporarily override) a portion of the user work schedule 234 to create a current overridden user work schedule 276, as illustrated by example 270 of FIG. 2D. In an example, the work schedule component 206 may identify a user activity pattern change 274 based upon real-time data 272 associated with the user. For example, the real-time data 272 may indicate that the user mapped an alternative route to a remote worksite on Tuesday 9:30 am due to a traffic accident, and that a new arrival time will be 10:15 am (e.g., as opposed to 9:00 am). The user activity pattern change 274 may specify that the user will be working at the remote worksite from 10:15 am to 3:30 pm due to traffic. Accordingly, the work schedule component 206 may override 278 a portion 280 of the user work schedule 234 based upon the user activity pattern change 274 to create the current overridden user work schedule 276.

Figure 3:
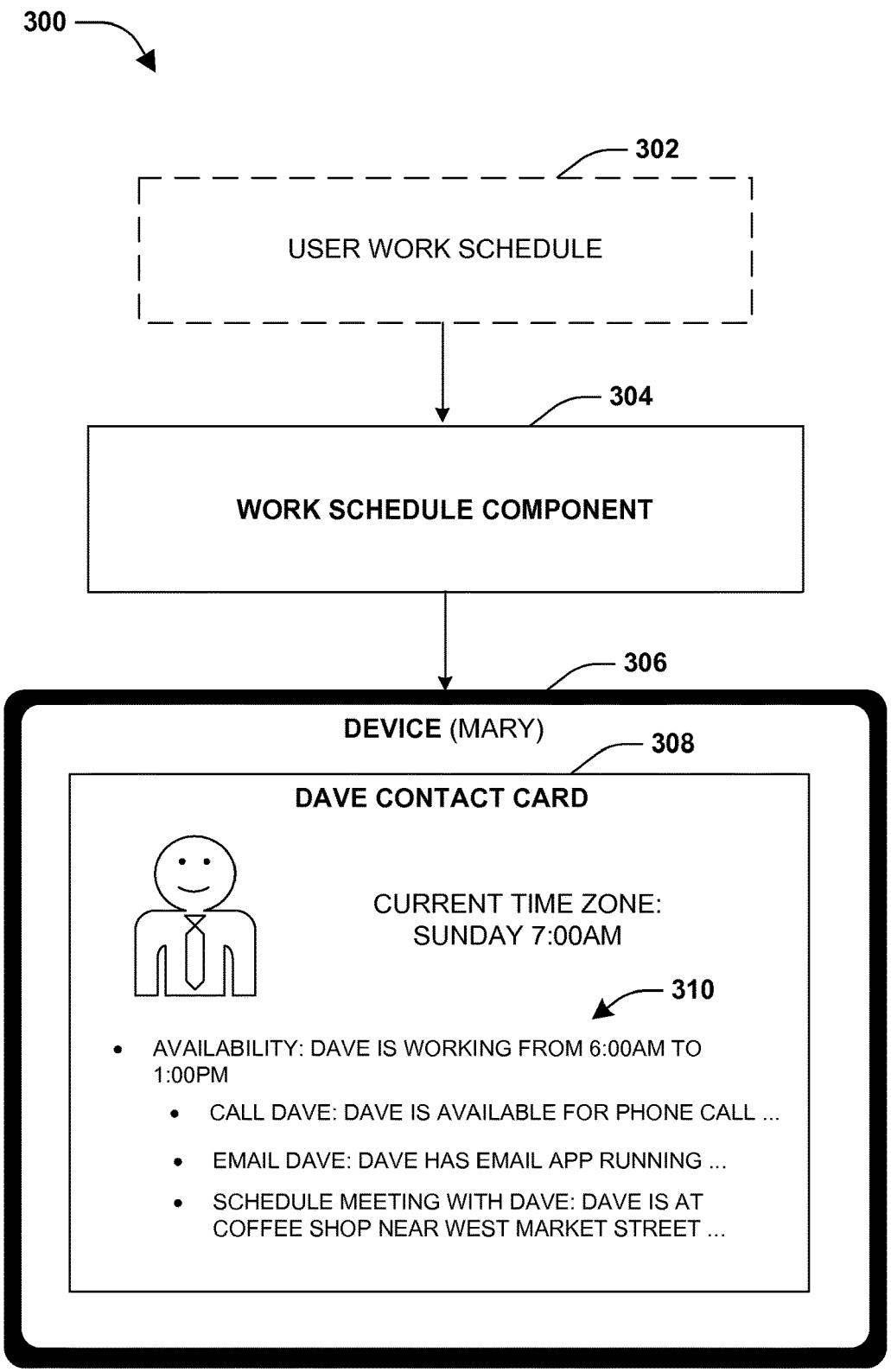
FIG. 3 is an illustration of an example of modifying a user interface based upon a user work schedule.

FIG. 3 illustrates an example 300 of modifying a user interface based upon a user work schedule 302. For example, a device 306 may be associated with a user Mary. The device 306 may host a contact app (e.g., an address book, a phone contact list, an internet phone contact list, an email contact list, a conferencing contact list, etc.). The contact app may display a contact card 308 for a user Dave. A work schedule component 304 may be configured to modify the contact card 308 based upon the user work schedule 302 for the user Dave. The user work schedule 302 may indicate that user Dave is working at a coffee shop from 6:00 am to 1:00 pm on Sunday. Accordingly, the work schedule component 304 may specify 310 user Dave's available through the contact card 308. For example, the contact card 308 may indicate that user Dave is currently working from 6:00 am to 1:00 pm, that user Dave is available to accept phone calls, that user Dave is available for emails (e.g., that user Dave has an email app running), that user Dave is available for a meeting (e.g., an in-person meeting at the coffee shop or is available to travel elsewhere for the meeting), and/or a variety of other information and/or functionality not illustrated.

Figure 4:
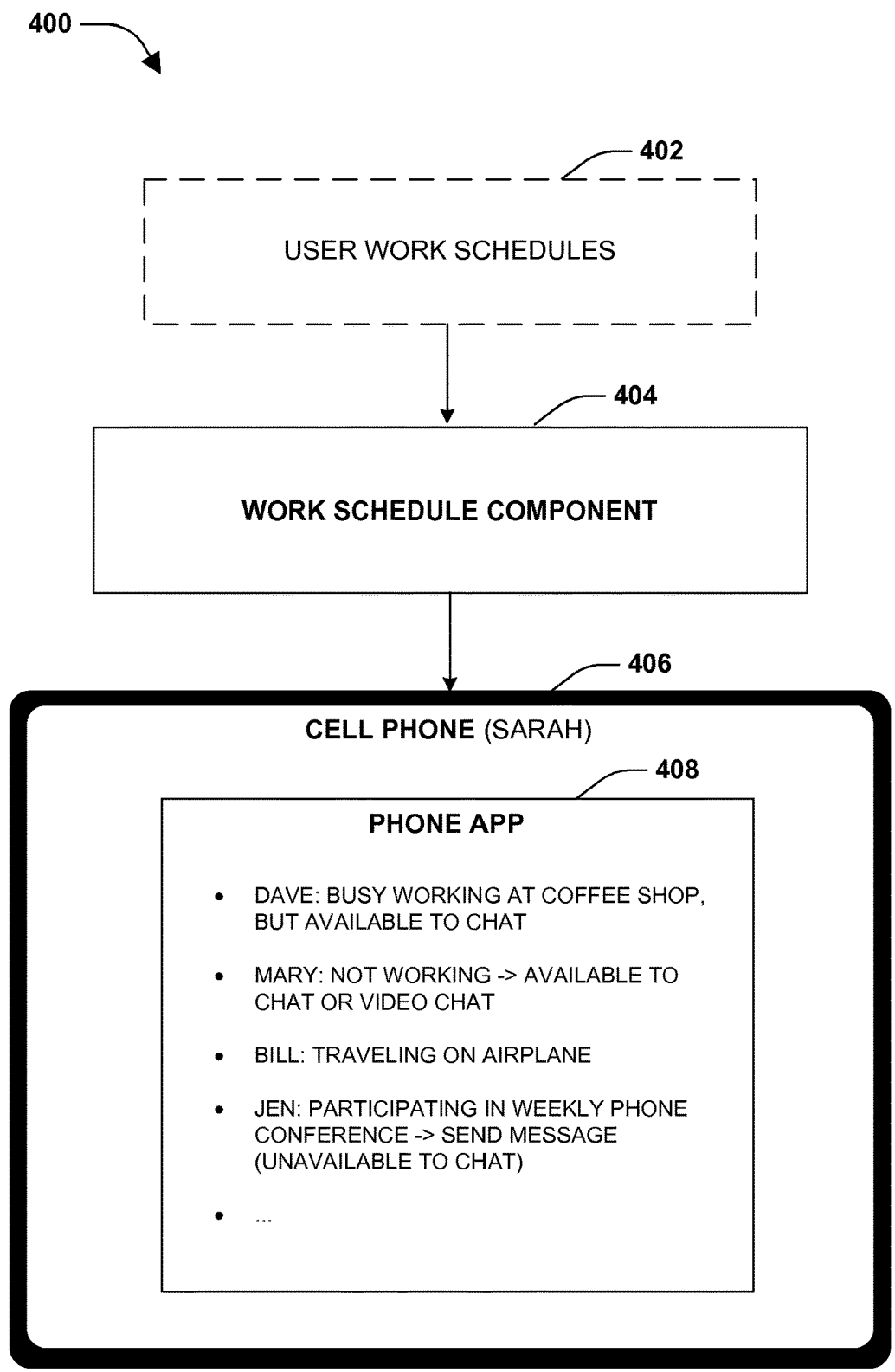
FIG. 4 is an illustration of an example of modifying a user interface based upon user work schedules.

FIG. 4 illustrates an example 400 of modifying a user interface based upon user work schedules 402. For example, a cell phone 406 may be associated with a user Sarah. The cell phone 406 may host a phone app 408 (e.g., a cellular phone app, an internet phone app, etc.). The phone app 408 may display a phone contact list. A work schedule component 404 may be configured to modify the phone contact list based upon the user work schedules 402 for user Dave, user Mary, user Bill, user Jen, and/or other users. The work schedule component 404 may modify the phone contact list of the phone app 408 to indicate that user Dave is currently busy working at a coffee shop but is available to chat, that Mary is not working and is available to chat and video chat, that Bill is traveling on an airplane, and that Jen is participating in a weekly phone conference and thus is available to receive messages but unavailable to receive phone calls.

Figure 5:
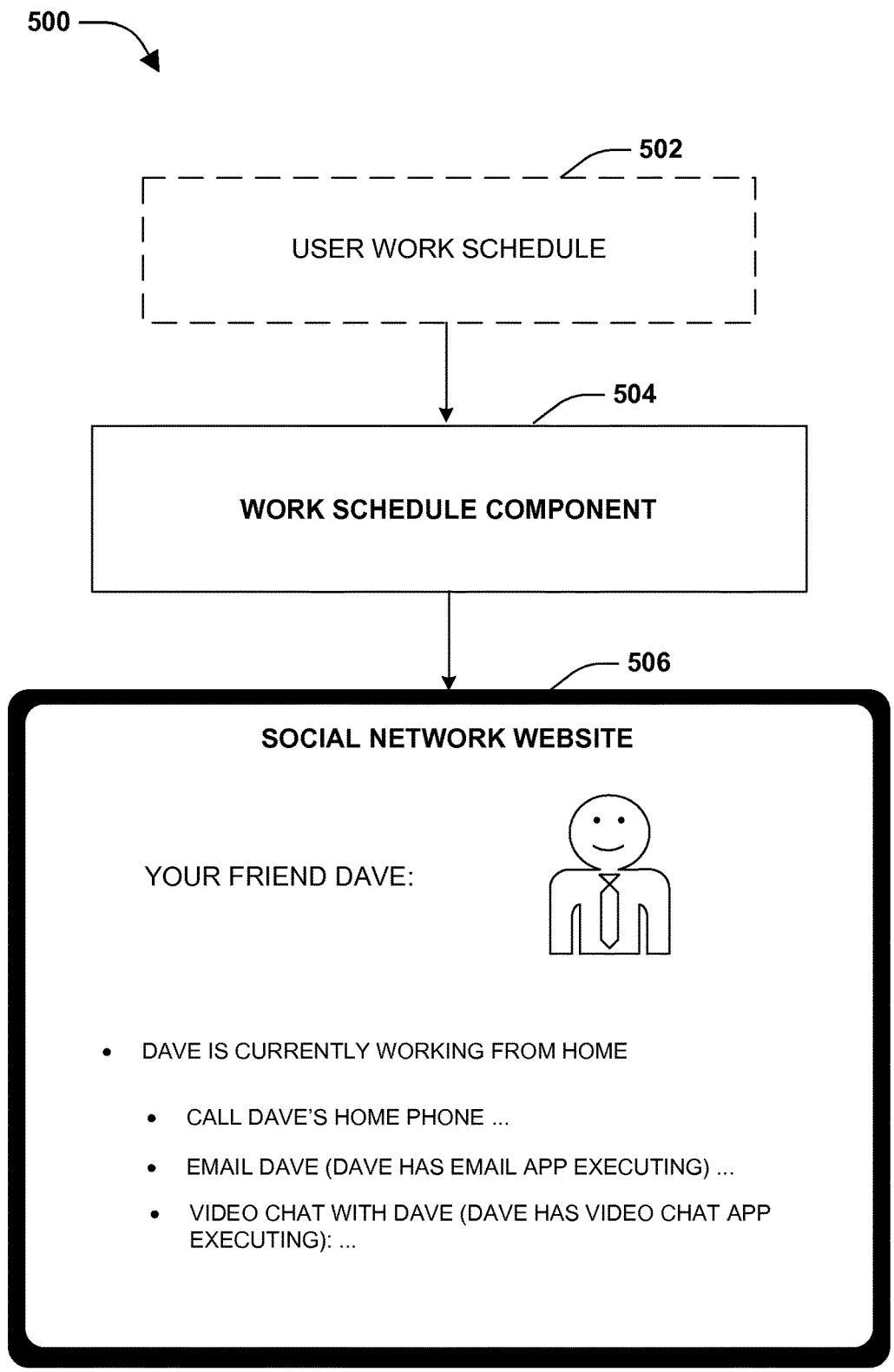
FIG. 5 is an illustration of an example of modifying a user interface based upon a user work schedule.

FIG. 5 illustrates an example 500 of modifying a user interface based upon a user work schedule 502. For example, a user may access a social network website 506. The user may navigate the social network website 506 to a social network profile for user Dave. A work schedule component 504 may be configured to modify the social network profile for user Dave based upon the user work schedule 502. The work schedule component 504 may modify the social network profile for user Dave to indicate that user Dave is currently working from home, that user Dave is available for a phone call, that user Dave is available for receiving email, and that user Dave is available for video chat.

Figure 6:
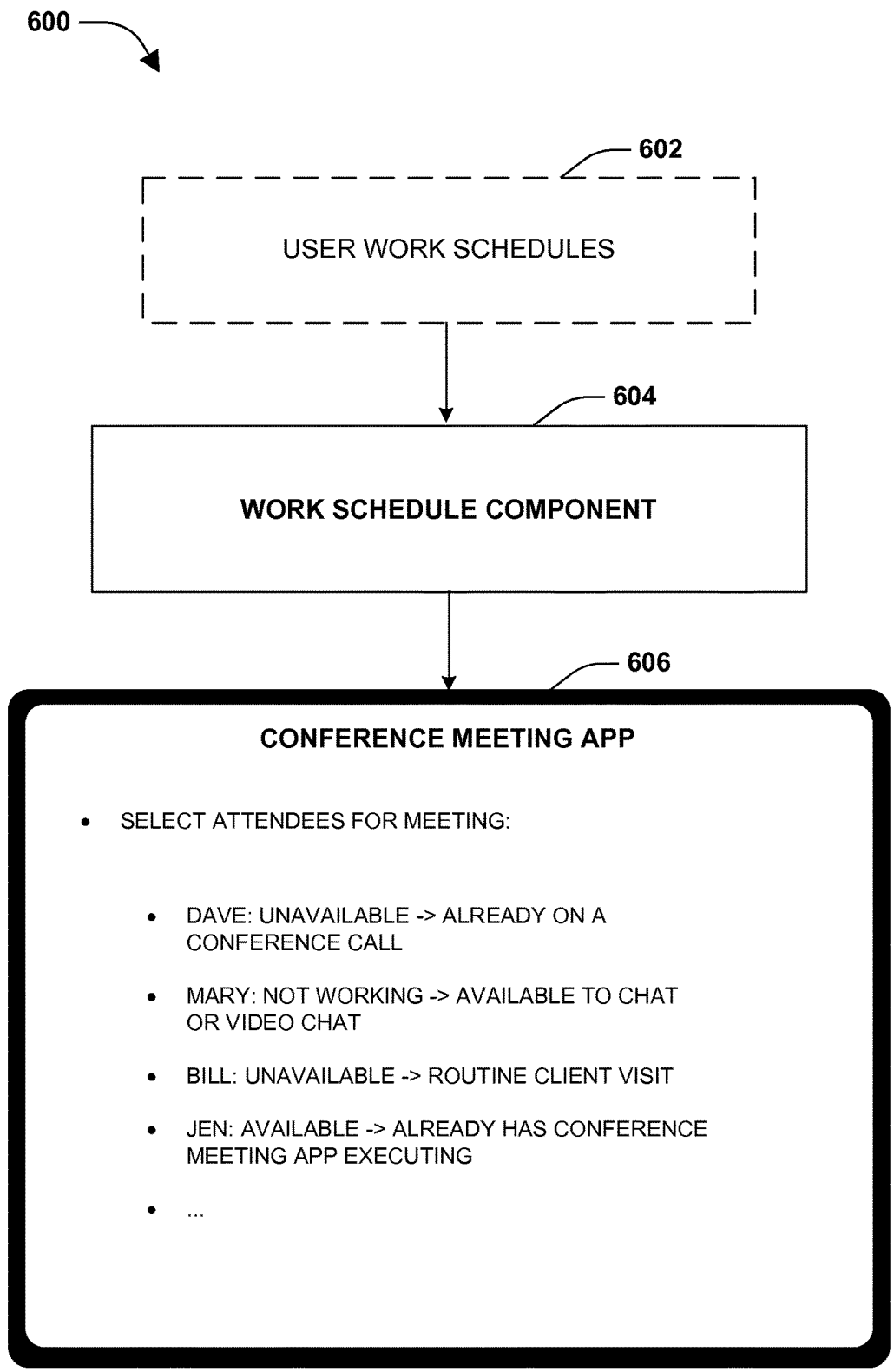
FIG. 6 is an illustration of an example of modifying a user interface based upon user work schedules.

FIG. 6 illustrates an example 600 of modifying a user interface based upon user work schedules 602. For example, a user may access a conference meeting app 606 through which the user may schedule a conference meeting with other users. A work schedule component 604 may be configured to modify the conference meeting app 606 based upon the user work schedules 602 for user Dave, user Mary, user Bill, user Jen, and/or other users. The work schedule component 604 may modify the conference meeting app 606 to indicate that user Dave is currently unavailable due to being on a conference call, that user Mary is not working and thus available to chat or video chat for a conference meeting, that Bill is unavailable due to a routine client visit, and that Jen is available because Jen already has a conference meeting app executing.

Figure 7:
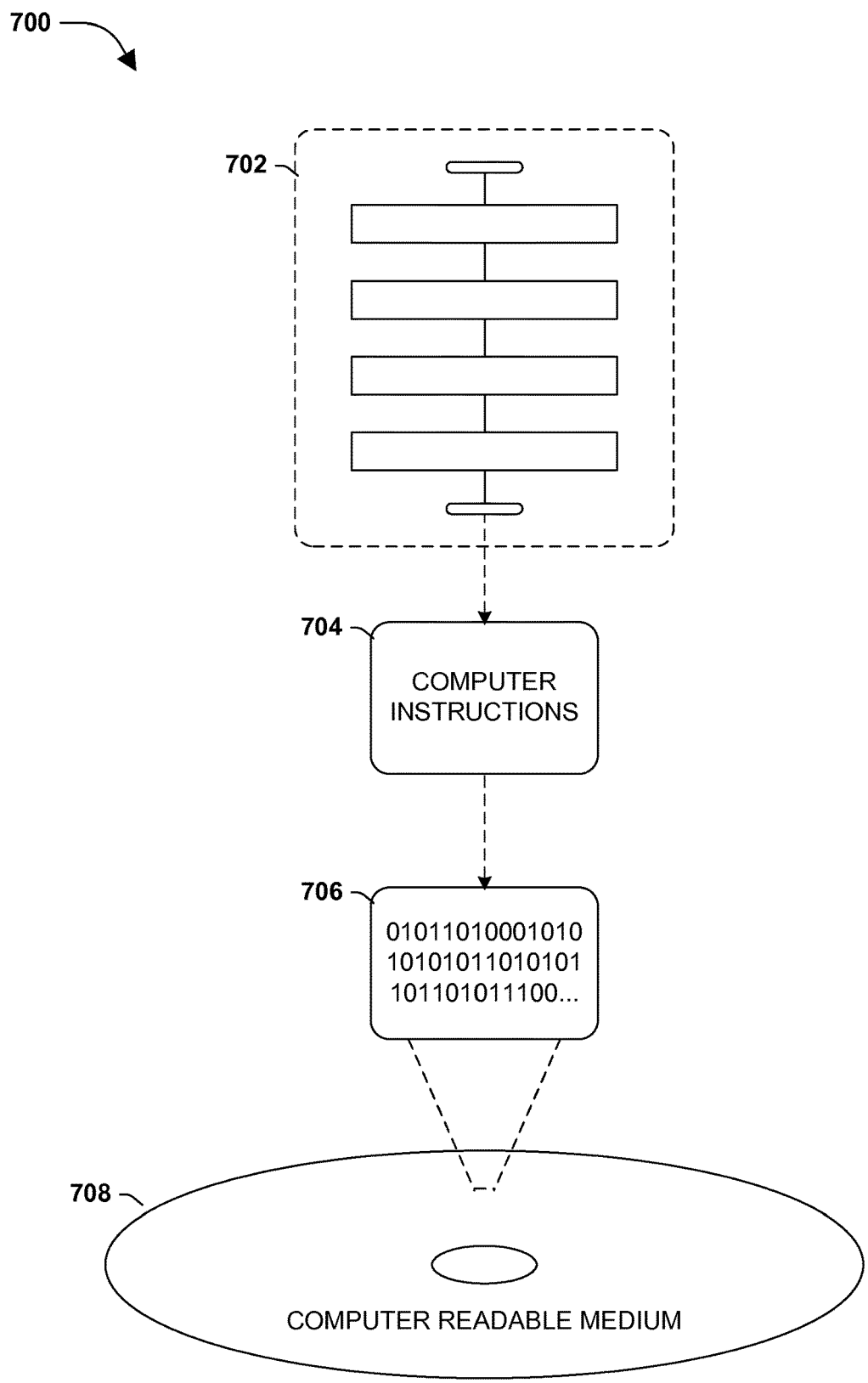
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1, for example. In some embodiments, the processor-executable instructions 704 are configured to implement a system, such as at least some of the exemplary system 212 of FIGS. 2A-2D, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
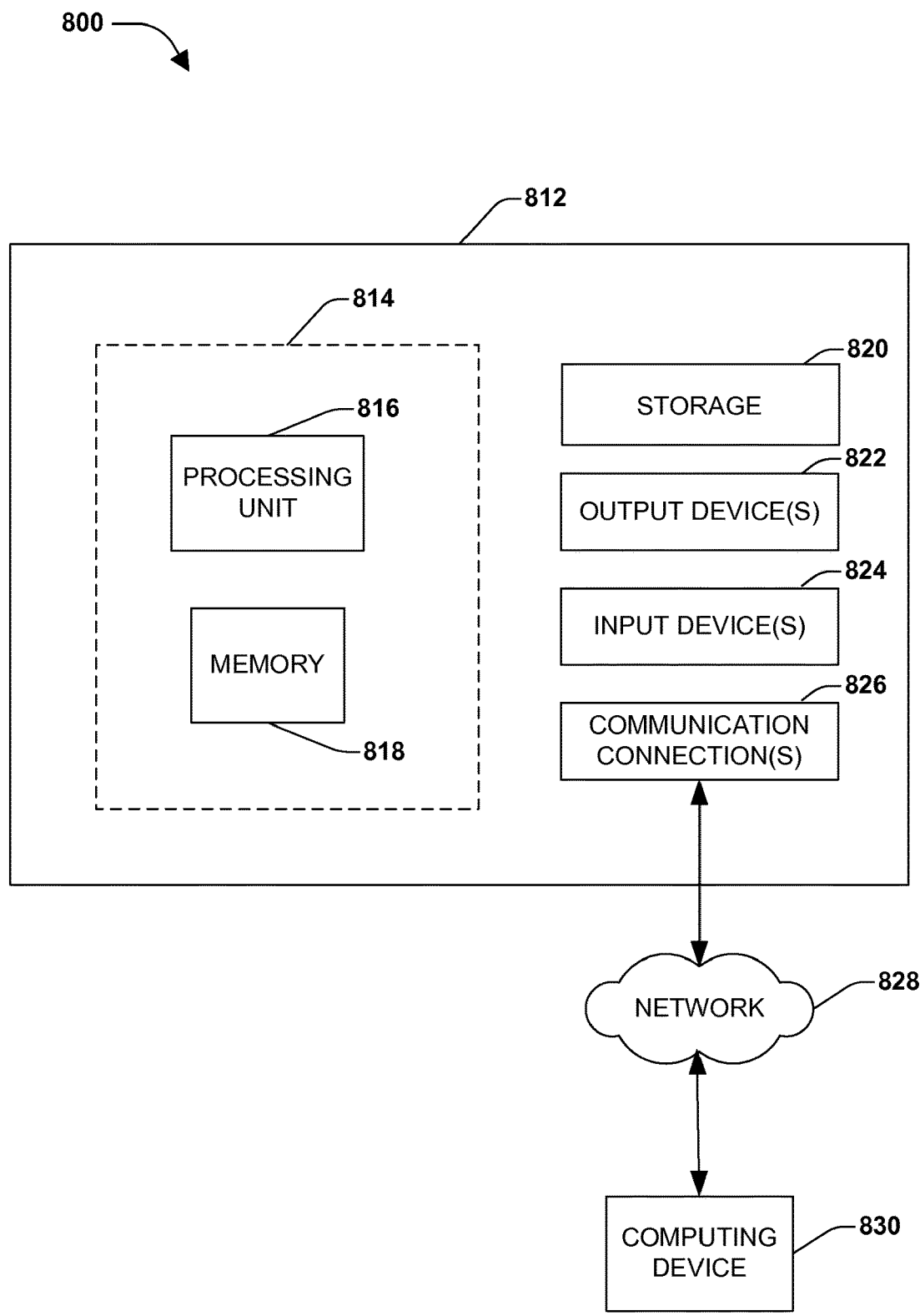
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for updating a user interface of an application with availability information for users of the application, the method comprising:
   retrieving, by an application hosted by a server, a set of client device signals determined by two or more client devices and associated with a user, wherein the set of client device signals comprises one or more of a device location, a current time, a mode of transportation, a device location check-in, an alarm, a charging state, a connectivity state, user data stored on a client device, or application data;
   evaluating the set of client device signals to determine a first availability status of the user, based on a set of user activity patterns for the user determined from the client device signals, wherein each user activity pattern reflects a temporal interval and includes an availability status of the user during the temporal interval;
   causing to be displayed, by a user interface of the application, the first availability status of the user;
   detecting a change in the first availability status of the user based, at least in part, on a change in the set of client device signals;
   determining a second availability status of the user by reevaluating the set of client device signals; and
   causing to be displayed, by the user interface of the application, the second availability status of the user.

2. The method of claim 1, further comprising:
displaying the first availability status and the second availability status of the user on a secondary user interface on a second client device connected with the server via the network.

3. The method of claim 1, further comprising:
generating the set of user activity patterns for the user based upon evaluating the set of client device signals, wherein the first availability status corresponds to a first user activity pattern of the set of user activity patterns for a first temporal interval and a first client device signal of the set of client device signals; and
determining a user work schedule of the user based upon the set of user activity patterns;
wherein the availability status comprises user-activity information that is usable to determine availability of the user; and
wherein the second availability status corresponds to a second user activity pattern of the set of user activity patterns for a second temporal interval and a second client device signal of the set of client device signals.

4. The method of claim 3, further comprising:
identifying a first work entry within the user work schedule, the first work entry occurring at the first temporal interval;
identifying a new client device signal associated with the first temporal interval;
generating a new user activity pattern based upon the new client device signal; and
overwriting the first work entry based upon the new user activity pattern to create an updated user work schedule.

5. The method of claim 3, further comprising:
defining a first work day schedule for a first work day of the user work schedule; and
defining a second work day schedule for a second work day of the user work schedule.

6. The method of claim 5, wherein the first work day schedule is different than the second work day schedule.

7. The method of claim 3, further comprising:
utilizing a machine learning algorithm to evaluate the set of user activity patterns to determine the user work schedule.

8. The method of claim 3, wherein determining the user work schedule comprises:
identifying the set of user activity patterns for inclusion within the user work schedule based upon at least one of a work conference call activity pattern, a work from home activity pattern, a work from out-of-office location activity pattern, a work-related application interaction activity pattern, a work-related website interaction activity pattern, a work-related service interaction activity pattern, a travel to meeting activity pattern, a travel to secondary work location activity pattern, or a meeting activity pattern.

9. The method of claim 1, further comprising:
identifying a recurring activity of the user based upon the set of client device signals.

10. The method of claim 3, further comprising:
applying a first user activity weight to a first user activity pattern of the set of user activity patterns to create a first weighted user activity pattern;
applying a second user activity weight to a second user activity pattern of the set of user activity patterns to create a second weighted user activity pattern; and
determining the user work schedule based upon evaluating the first weighted user activity pattern and the second weighted user activity pattern.

11. The method of claim 10, further comprising:
generating the first user activity weight based upon at least one of an activity frequency, an activity intensity, an activity confidence, or an activity freshness.

12. The method of claim 3, further comprising:
aggregating one or more client device location signals over time to detect a pattern of recurring instances of a work activity as a first user activity pattern for inclusion within the set of user activity patterns.

13. The method of claim 1, further comprising:
evaluating a user context of the user to identify the set of client device signals for retrieval, the user context comprising at least one of: a social network profile, a website accessed by the user, a social network post, an email, a message, a calendar entry, real-time data, a phone call, an application executed by the user, interaction with a service, a description of a current user location, or user data.

14. A system for modifying a user interface of an application with availability information for one or more users of the application based at least in part on a work schedule for the one or more of users determined by the application, comprising:
a work schedule component configured to:
retrieve, by an application hosted by at least one of a client device and a server, a set of client device signals sensed by the client device and associated with a user, wherein the set of client device signals comprises one or more of a device location, a current time, a mode of transportation, a device location check-in, an alarm, a charging state, a connectivity state, user data stored on a client device, or application data;
generate a set of user activity patterns for the user based upon evaluating the set of client device signals, wherein each user activity pattern of the set of user activity patterns reflects a temporal interval and includes an availability status of the user;
apply a first user activity weight to a first user activity pattern of the set of user activity patterns to create a first weighted user activity pattern;
apply a second user activity weight to a second user activity pattern of the set of user activity patterns to create a second weighted user activity pattern;
determine a user work schedule of the user based upon the set of user activity patterns, wherein the determination is based at least in part upon evaluating the first weighted user activity pattern and the second weighted user activity pattern;
cause to be displayed, via a user interface of the application, a first availability status of the user, wherein the first availability status corresponds to a first user activity pattern of the set of user activity patterns for a first temporal interval and a first client device signal of the set of client device signals;
detect a change in the availability status of the user based, at least in part, on one or more of an expiration of the first temporal interval and a change in the first client device signal of the set of client device signals;
determine a second availability status of the user, wherein the second availability status corresponds to a second user activity pattern of the set of user activity patterns for a second temporal interval and a second client device signal of the set of client device signals; and cause to be displayed, via the user interface of the application, the second availability status of the user.

15. The system of claim 14, the work schedule component further configured to display the first availability status and the second availability status of the user on a secondary user interface provided to a second user.

16. The system of claim 14, the work schedule component further configured to:
identify a first work entry within the user work schedule, the first work entry occurring at the first temporal interval;
identify a new client device signal associated with the first temporal interval;
generate a new user activity pattern based upon the new client device signal; and
overwrite the first work entry based upon the new user activity pattern to create an updated user work schedule.

17. The system of claim 14, the work schedule component further configured to:
identify a user activity pattern change based upon real-time data sensed by the client device and associated with the user; and
override a portion of the user work schedule based upon the user activity pattern change.

18. One or more computer storage media comprising instructions which when executed perform a method for modifying a user interface of an application with availability information for one or more users of the application based at least in part on a work schedule for the one or more of users determined by the application, the method comprising:
retrieving, by an application hosted by at least one of a client device and a server, a set of client device signals sensed by the client device and associated with a user, wherein the set of client device signals comprises client device signals that were aggregated over time, and wherein the set of client device signals comprises one or more of a device location, a current time, a mode of transportation, a device location check-in, an alarm, a charging state, a connectivity state, user data stored on a client device, or application data;
generating a set of user activity patterns for the user based upon evaluating the client device signals that were aggregated over time, wherein each user activity pattern of the set of user activity patterns reflects a recurring temporal interval and includes an availability status of the user during the recurring temporal interval;
determining a user work schedule of the user based upon the set of user activity patterns;
modifying a user interface based upon the work schedule to create a modified user interface, the modified user interface displaying a first availability status for the user;
accessing real-time data sensed by the client device and associated with the user;
identifying a user activity pattern change based upon the real-time data sensed by the client device and associated with the user;
determining a second availability status for the user, wherein the second availability status is determined based upon the real-time data sensed by the client device;
overriding a portion of the user work schedule based upon the user activity pattern change to create a current overridden user work schedule comprising the second availability status for the user; and
causing the modified user interface to be adjusted based upon the current overridden user work schedule to display the second availability status for the user.

19. The method of claim 3, further comprising:
identifying a user activity pattern change based upon real-time data sensed by the client device and associated with the user; and
overriding a portion of the user work schedule based upon the user activity pattern change to create a current overridden user work schedule.

20. The method of claim 1, further comprising:
applying a first client device signal weight to a first client device signal of the set of client device signals to create a first weighted client device signal;
applying a second client device signal weight to a second client device signal of the set of client device signals to create a second weighted client device signal, the second client device signal weight different than the first client device signal weight; and
evaluating the set of client device signals comprising the first weighted client device signal and the second weighted client device signal to determine the first availability status of the user.

* * * * *